United States Patent [19]

Mazzone et al.

[11] Patent Number: 4,951,034

[45] Date of Patent: Aug. 21, 1990

[54] LIGHT BALL ELECTRONIC MOUSE

[75] Inventors: Jean-Luc Mazzone, Apples; Marc Bidiville, Pully, both of Switzerland

[73] Assignees: Logitech, Inc., Fremont, Calif.; Logitech SA, Apples, Switzerland

[21] Appl. No.: 13,646

[22] Filed: Feb. 12, 1987

[51] Int. Cl.⁵ .............................................. G09G 5/00
[52] U.S. Cl. ................................ 340/710; 74/471 XY
[58] Field of Search .............. 340/709, 710; 273/D28, 273/148 B; 74/471 R, 471 XY, 198

[56] References Cited

U.S. PATENT DOCUMENTS

| | | | |
|---|---|---|---|
| 3,013,441 | 12/1961 | Alexander | 74/471 XY |
| 3,643,148 | 2/1972 | Brown et al. | 340/710 |
| 4,538,476 | 9/1985 | Loque | 273/148 B |
| 4,559,532 | 12/1985 | Hosogoe | 340/710 |
| 4,562,347 | 12/1985 | Hovey et al. | 340/710 |
| 4,612,539 | 9/1986 | Hosogoe et al. | 340/710 |

Primary Examiner—Jeffery A. Brier
Attorney, Agent, or Firm—Harrison & Eakin

[57] ABSTRACT

A light ball electronic mouse using a ball with a specific gravity between one and four, X and Y shaft encoders of substantially reduced diameter, and a pressure roller of substantially reduced force for controlling the position of a cursor in a video display.

7 Claims, 3 Drawing Sheets

LIGHT BALL ELECTRONIC MOUSE

FIELD OF THE INVENTION

The present invention relates generally to a control device for the displacement of a visual cursor over a visual screen such as a computer monitor or the like. The invention relates particularly to an electronic mouse form of control device.

BACKGROUND OF THE INVENTION

Various forms of electronic mice are known. A rudimentary form of electronic mouse is shown in German Offenlegungsschrift 1916348, and another example is shown in U.S. Pat. No. 3,987,685. Still other forms are marketed by Alps, Apple, and a number of other companies including the assignee of the present invention. Each of these electronic mice operate in what is fundamentally a very similar way, in that each employs a ball located within a housing such that the rotation of the ball causes generation of either an electrical, mechanical or optical indicia when the ball is rolled across a surface.

In conventional electronic mice, the ball is contained within the housing by various means, some of which include a plurality of wheels which frictionally engage the ball. Also in conventional systems, two of the friction wheels drive shaft encoders of any of various means. A third friction wheel, in the conventional arrangement, is loaded by means of a spring or otherwise to force the ball into engagement with the two wheels which drive the shaft encoders. Indicia of movement are generated by the shaft encoders operating along X and Y axes so that angular movements can be tracked with reasonable accuracy.

One of the major difficulties with electronic mice has been the requirement that the movement of the cursor on the screen accurately reflect the movement of the mouse across the chosen surface. During the initial stages of development of electronic mice, a fairly typical approach to meet this requirement was simply to provide a heavy steel ball as the rotational member.

After some further development, it was determined that coating the heavy steel ball with a material having a high frictional coefficient improved the performance of the mouse. Almost inexorably, the ball portion cf the mouse developed around the concept of a heavy steel ball coated by a friction inducing material in the belief that tis approach materially improved tracking. Improvements for tracking typically involved increasing the ball weight, or using a coating with a greater frictional coefficient.

However, the use of a heavy ball in the mouse is not without its limitations. One such limitation is that the heavy ball makes the mouse heavy to operate, which is a significant drawback in at least some applications. Another limiation is that the heavy ball is expensive, and the expense is significantly increased by the requirement for a frictional coating. These extra expenses are particularly significant because both the ball and the coating must be uniformly applied to provide uniform roundness needed for the best possible tracking.

In addition, the extra mass of steel or steel coated balls have created problems during shipping and usage. When a mouse having a massive ball is shipped with the ball already inside the ball cage, the shocks generated by the massive ball are capable of damaging the remainder of the mouse. In addition, in the event the mouse is dropped during usage, the massive ball is also capable of creating injurious shocks. The present invention lessens or eliminates these concerns, as will be appreciated from the following summary of the invention.

SUMMARY OF THE INVENTION

The present invention avoids the aforementioned limitations of the prior art by eliminating the need for a heavy ball, and in addition provides other advantages which will be better appreciated from the detailed description of the invention provided hereinafter.

More particularly, the present invention provides a ball formed entirely of a relatively light material having a high frictional coefficient. The ball may be formed by casting or other techniques known in the art, and entirely eliminates the need for application of a frictional coating, or the expense of a relatively high quality steel ball. It will therefore be appreciated that the ball of the present invention will have a specific gravity far less than that of the prior art.

To ensure proper tracking, the housing for the ball must be significantly modified compared to housings used for mice employing a heavy ball. Thus, the configuration of the shaft encoders must be altered for the lower inertial forces generated by the lighter ball. Likewise the frictional force of the third friction wheel must be significantly modified to ensure that the ball is not forced away from the surface over which the mouse is moved.

It is therefore one object of the present invention to provide an electronic mouse which provides proper tracking using a relatively light ball.

It is another object of the present invention to provide an electronic mouse which does not require a heavy ball with a frictional coating.

These and other objects of the present invention will be better appreciated from the following Detailed Description of the invention, in which FIG. 1 is an exploded view of an electronic mouse according to the present invention;

DETAILED DESCRIPTION OF THE INVENTION

Figure 1:
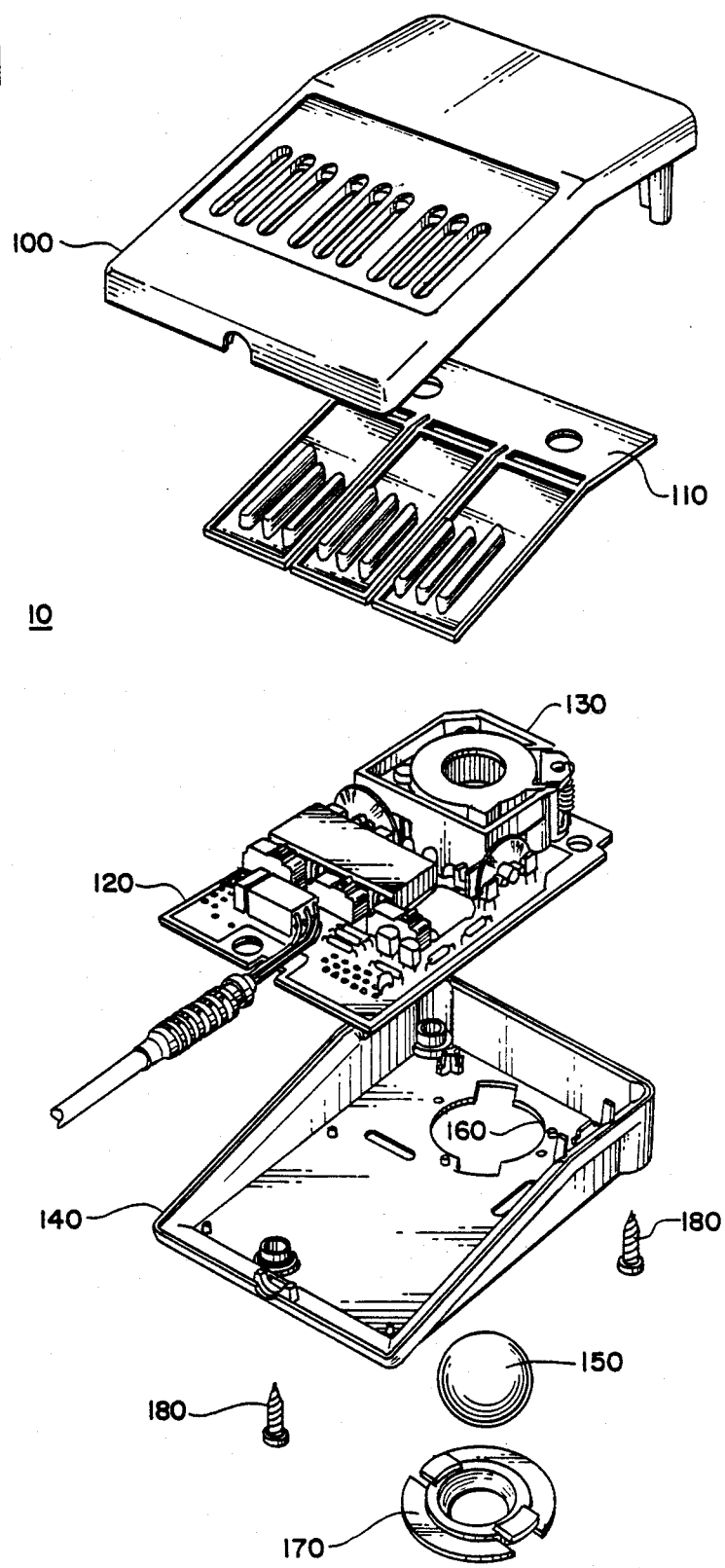

With reference to FIG. 1, one embodiment of an electronic mouse 10 according to the present invention includes an upper housing 100, a switch assembly 110 (which may be incorporated into other components in many embodiments), and a printed circuit board 120. Preferably, but not necessarily, a ball cage 130 is mounted directly onto the board 120. The board 120 is fixed within the upper housing 100 and a lower housing 140. Alternatively, the ball cage 130 could be formed as part of the lower housing 140.

A ball 150, which is preferably made of nitril butadiene rubber, fits through an opening 160 in the lower housing and thence into the ball cage 130. The ball 150 is retained within the lower housing, and also within the ball cage, by means of a ball retaining clip 170 which locks into the opening 160 by any suitable means. The entire assembly may be fixed together by means of screws 180 or other conventional techniques.

Entirely unlike the rior art, the ball 150, which for the embodiment shown is typically on the order of 22 mm diameter but may vary with design and application, does not include a core of steel or other metal, but instead may be formed entirely by injection molding in one shot. Conventional rubber coated steel balls are formed by injection molding the rubber coating in two shots to ensure proper centering.

Unlike conventional balls which have specific gravities on the order of 7.8 grams/cubic centimeter (for a steel ball) the ball of the present invention has a specific gravity on the order of 1.24 grams per cubic centimeter. In addition, unlike conventional balls which are typically metals coated with rubber or other friction-increasing materials, the ball 150 of the present invention inherently includes such a frictional surface when the molding process is completed. In addition, the sphericity of the ball 150 is more uniform than may be readily achieved with coated balls as found in the prior art. Flashing, if any, may be removed by conventional grinding techniques. In addition to balls solidly cast of a lightweight material such as rubber, other materials such as plastics having a suitable frictional coefficient may be used.

Figure 2:
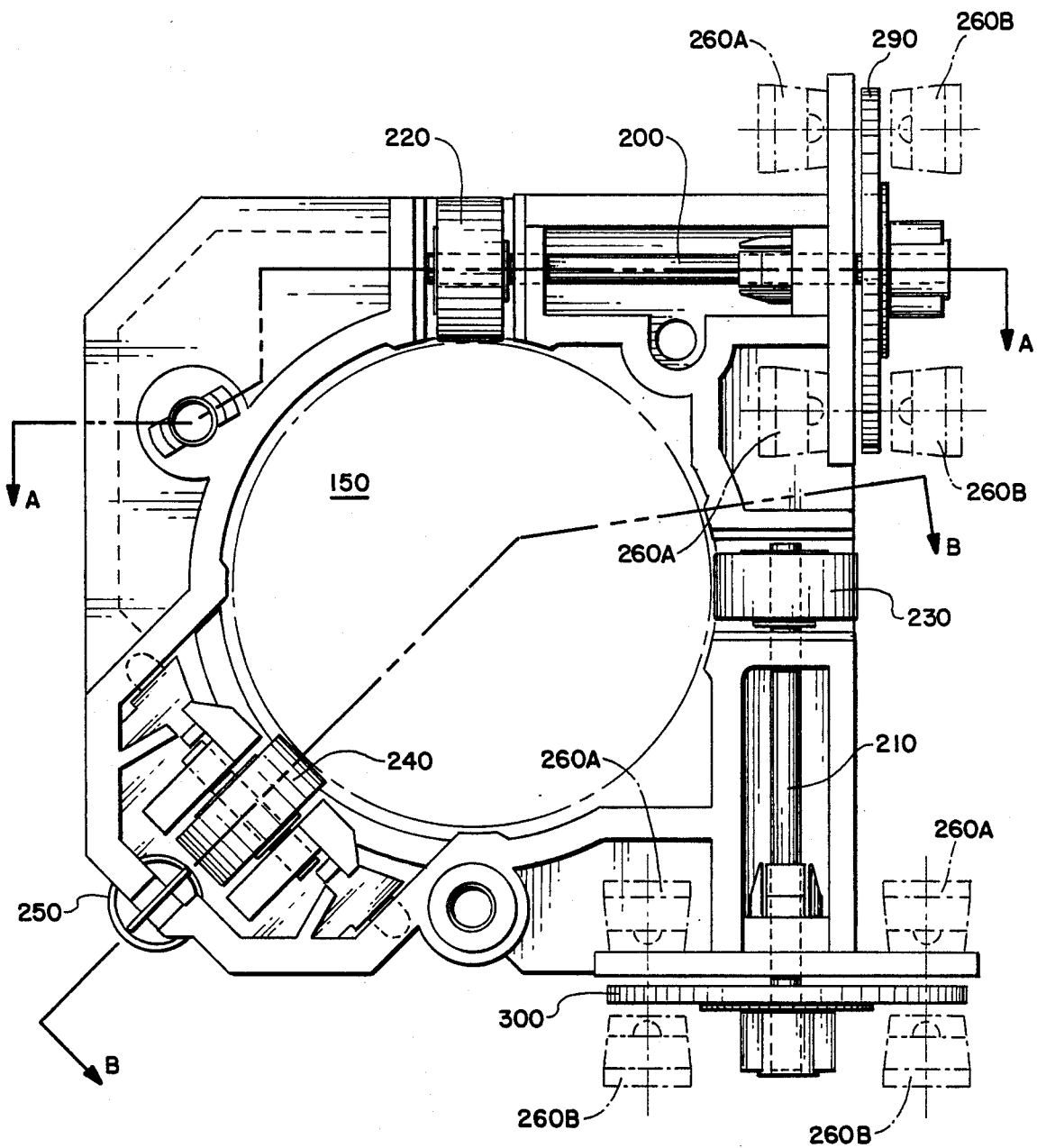
FIG. 2 shows in bottom view the ball cage according to the present invention, with sections A—A and B—B.

However, for the ball 150 of the present invention to properly indicate to the remainder of the electronic mouse 10 the movement of the ball across the surface, a different ball cage 130 is needed as compared with those found in the prior art. Referring now to FIG. 2, in which the ball cage 130 is shown from a bottom view, and with the ball 150 inserted into the cavity of the ball cage, the ball cage of the present invention may be appreciated.

The ball cage 130 may be formed in any suitable manner such as injection molding of a polymeric material (for example, Delrin), as well as other conventional machining techniques. The ball cage includes two shaft encoder assemblies 200 and 210, which may for example be optical encoders having a 200 dot per inch resolution. The encoders and 210 are orthogonally disposed within the ball cage 130, so that one encoder reflects X-axis movement of the mouse 10 and the other encoder reflects Y-axis movement. The shaft encoders, which are preferably identical to one another except in their disposition within the ball cage 130, may be better appreciated from FIG. 3.

Each shaft encoder 200 and 210 engages the ball 150 by means of rollers 220 and 230, respectively, which may be made of any suitable plastic or other material capable of maintaining a frictional engagement with the ball 150 during rotational movement of the ball. The two rollers 220 and 230 are designed to maintain continuous contact with the ball during ball movement. This contact is achieved in part by the use of a pressure roller 240 disposed to force the ball against the two shaft encoder wheels. The pressure roller 240 may be forced against the ball 150 by means of a spring 250, which can be better appreciated from FIG. 4 as discussed in greater detail hereinafter.

To better appreciate the arrangement of the ball cage 130, four pairs of LEDs and associated phototransistors 260a-b are also shown in FIG. 2, together with masks 270 and 280. Although LEDs and associated phototransistors are shown, it will be appreciated that other arrangements are readily possible, and any suitable combination of a light source and a photosensitive device may be used. The masks, which will typically include slits, are positioned adjacent their respective encoder wheels 290 and 300, with the LED and associated phototransistor disposed on opposite sides thereof. In this manner, the movement of the ball generates quadrature signals for X-axis movement and Y-axis movement. The signals may then be manipulated by the electronics included on the board 120 to cause appropriate communication to be had with the host system, which may for example be a personal computer.

Figure 3:
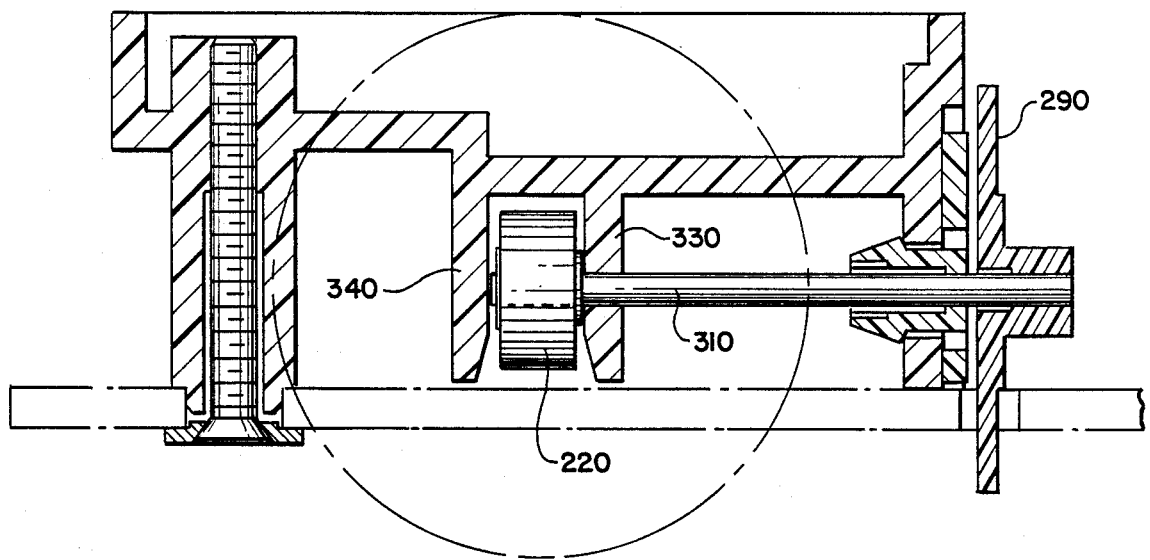
FIG. 3 shows section A—A of FIG. 2.

Referring now to FIG. 3, details of the shaft encoders 200 and 210 may be better appreciated. Each shaft encoder 200 (or 210) includes the roller 220, which is connected by a shaft 310 to the associated encoder wheel 290. The shaft size is preferably on the order of 0.8 mm diameter (unlike the prior art which may be on the order of 1.5 mm diameter), and is typically constructed of polished stainless steel, although low friction plastics having appropriate rigidity are acceptable in some applications.

The shaft 310 extends through a bearing 320, and also extends through a hole in a housing flange 330 into the roller 220. The shaft encoder is therefore fixed in position by virtue of the location of the roller 220 being located between the flange 330 and a flange 340. The ball 150 may be seen in phantom over the shaft encoder assembly, so that the engagement of the roller 220 at approximately the midpoint of the ball 150 can be readily appreciated.

Figure 4:
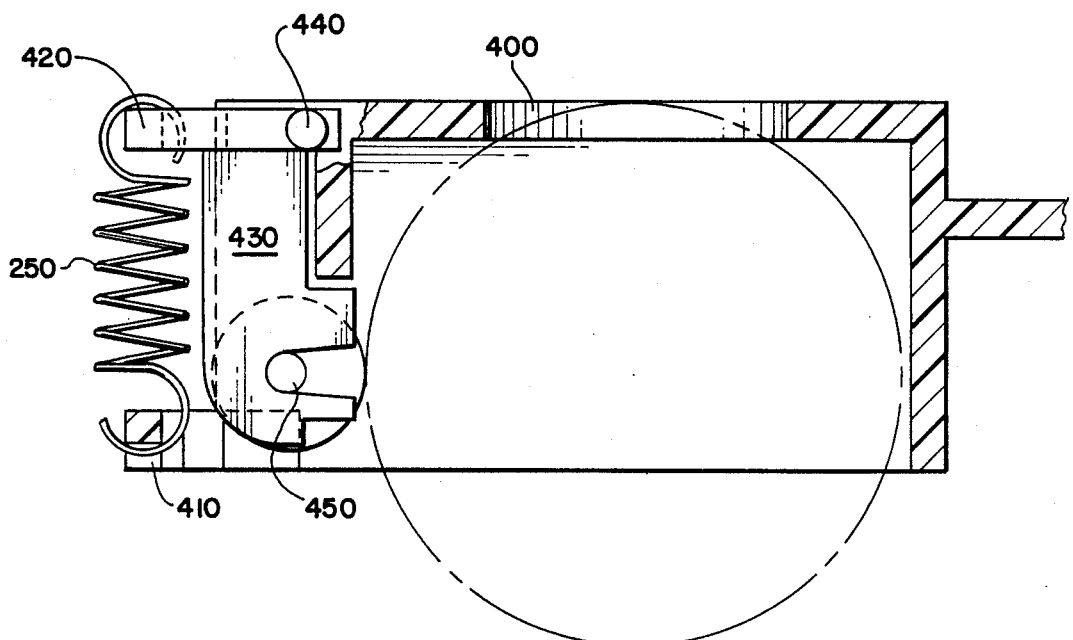
FIG. 4 shows section B—B of FIG. 2.

Referring now to FIG. 4, the pressure roller 240 and its related assembly may be better appreciated. As with FIGS. 2 and 3, the outline of the ball 150 may be seen so that relative size and position of the ball and roller may be better appreciated. It may also be appreciated that the top of the ball cage 130 may include a hole 400 to minimize the height of the ball cage 130 and also to serve as a limiter for the vertical movement of the ball 150.

As discussed in connection with FIG. 2, the pressure roller 240 is directed against the ball 150 by means of a spring 250. The spring 250 is connected at one end to a peg 410 at the base of the ball cage 130, and at the other end to a peg 420 on an L-bracket 430. The L-bracket includes a pair of pins 440 (only one of which is shown in FIG. 4) which pivotably support the L-bracket 430 on the ball cage 130. The pressure roller 240, which is held in position in the lower arm of the L-bracket 430 by means of either a pin 450 or other suitable means, is therefore forced against the ball 150 in accordance with the spring constant of the spring 250 and the length of the pivot arms of the L-bracket 430.

The force applied by the pressure roller against the ball 150 is significantly and unexpectedly less than would be appropriate for conventional metal balls or rubber coated metal balls. The typical force applied to a rubber coated ball in a conventional arrangement has been on the order of 65 grams, and on the order of 85 grams for a steel ball which is not rubber coated. In the present invention, the force applied to the composite ball 150 is on the order of 22 grams. It has been determined that the force applied to the ball is directly related to the mass of the ball, but inversely related to the deformability of the ball.

Having fully described one embodiment of the invention, numerous alternatives and equivalents which do not depart from the invention will be apparent to those skilled in the art, given the teachings herein. As a result, the present invention not to be limited by the foregoing description of one embodiment, but only by the appended claims.

What is claimed is:
1. An electronic mouse comprising a ball having a specific gravity between one and four grams per cubic centimeter, a housing having a cavity therein capable of receiving the ball, the housing further having an opening in the lower surface thereof permitting the ball to roll across a surface, a pair of encoders maintained at least partially within the housing and in contact with the ball by means of a pressure roller, the force applied by the pressure roller against the ball being less than thirty grams.

2. The electronic mouse of claim 1 wherein said encoders are shaft encoders and the shafts of said encoders are formed of stainless steel having a diameter on the order of 0.8 mm.

3. The electronic mouse of claim 1 wherein said encoders are shaft encoders and the shafts of said encoders are formed of plastic having a diameter on the order of 0.8 mm.

4. The electronic mouse of claim 1 wherein the ball is formed of nitril butadiene rubber.

5. The electronic mouse of claim 1 wherein the ball has at least an exterior layer of nitril butadiene rubber.

6. An electronic mouse having a ball comprised at least partially of rubber and having a specific gravity between one and three grams per cubic centimeter, a housing having an opening in the bottom thereof and a cavity therein capable of receiving the ball and permitting the ball to be rolled across a surface while within the cavity, a pair of shaft encoders positioned within the housing for indicating movement of the ball in X and Y directions and maintained in substantially constant contact with the ball by means of a pressure roller, the pressure roller being configured to apply a quiescent force on the ball of less than thirty grams.

7. An electronic mouse having a ball formed by injection molding in a single shot and having a specific gravity between one and three grams per cubic centimeter, a housing having an opening in the bottom thereof and a cavity therein capable of receiving the ball and permitting the ball to be rolled across a surface while within the cavity, a pair of shaft encoders positioned within the housing for indicating movement of the ball in X and Y directions and maintained in substantially constant contact with the ball by means of a pressure roller, the pressure roller being configured to apply a quiescent force on the ball which is substantially proportional to a force of less than thirty grams on a ball having a diameter of 22 millimeters and a specific gravity of 1.24 grams per cubic centimeter.

* * * * *